United States Patent
Panciroli

(10) Patent No.: US 9,008,945 B2
(45) Date of Patent: Apr. 14, 2015

(54) TURBOSUPERCHARGED INTERNAL COMBUSTION ENGINE CONTROL METHOD

(75) Inventor: Marco Panciroli, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 704 days.

(21) Appl. No.: 13/270,330

(22) Filed: Oct. 11, 2011

(65) Prior Publication Data

US 2012/0123663 A1     May 17, 2012

(30) Foreign Application Priority Data

Oct. 11, 2010    (IT) .............................. BO2010A0604

(51) Int. Cl.

| G06F 19/00 | (2011.01) |
|---|---|
| G06G 7/70 | (2006.01) |
| F02D 41/00 | (2006.01) |
| F02D 41/10 | (2006.01) |
| F02B 37/18 | (2006.01) |
| F02B 37/16 | (2006.01) |
| F02D 41/20 | (2006.01) |

(52) U.S. Cl.
CPC ............ F02D 41/0007 (2013.01); *F02B 37/186* (2013.01); *F02B 2037/162* (2013.01); F02D 41/107 (2013.01); *F02D 2041/2048* (2013.01); *Y02T 10/144* (2013.01)

(58) Field of Classification Search
USPC .............. 701/102, 100, 107, 114; 123/559.1, 123/564; 60/597, 598, 600, 602, 608
See application file for complete search history.

(56) References Cited

U.S. PATENT DOCUMENTS

| 5,829,254 | A | * | 11/1998 | Hayashi et al. | ................. | 60/602 |
|---|---|---|---|---|---|---|
| 6,279,551 | B1 | * | 8/2001 | Iwano et al. | .................. | 123/564 |
| 7,509,803 | B2 | * | 3/2009 | Panciroli | .......................... | 60/600 |
| 7,650,218 | B2 | * | 1/2010 | Andreae et al. | ............... | 701/101 |
| 7,802,427 | B2 | * | 9/2010 | Gehrke et al. | .................. | 60/602 |
| 8,091,358 | B2 | * | 1/2012 | Panciroli | ........................ | 60/602 |
| 2007/0033936 | A1 | * | 2/2007 | Panciroli | ........................ | 60/602 |
| 2009/0013688 | A1 | * | 1/2009 | Panciroli | ........................ | 60/602 |

(Continued)

FOREIGN PATENT DOCUMENTS

| DE | 10317959 A1 | 11/2004 |
|---|---|---|
| EP | 1323912 A1 | 2/2003 |

(Continued)

OTHER PUBLICATIONS

Jun. 17, 2011 Search Report for Italian Patent App. No. BO20100604.

*Primary Examiner* — Hieu T Vo
*Assistant Examiner* — Sherman Manley
(74) *Attorney, Agent, or Firm* — Howard & Howard Attorneys PLLC

(57) ABSTRACT

A method of controlling an internal combustion engine supercharged by a turbosupercharger having a turbine and a compressor; the control method including the steps of: determining, in a reduced mass flow/compression ratio graph, at least one limit operation curve of the compressor representing a limit of the operating range of the compressor; controlling the turbosupercharger to keep the actual reduced mass flow and actual compression ratio of the compressor within the limit defined by the limit operation curve of the compressor; determining an index as a function of the dynamics of the reduced mass flow of the compressor; and modifying the limit operation curve of the compressor as a function of the index.

25 Claims, 6 Drawing Sheets

(56) References Cited

U.S. PATENT DOCUMENTS

2012/0109491 A1* 5/2012 Panciroli ................ 701/102
2012/0109492 A1* 5/2012 Panciroli ................ 701/102

FOREIGN PATENT DOCUMENTS

| EP | 1741895 A1 | 10/2007 |
|----|------------|---------|
| EP | 2014894 A1 | 1/2009  |

* cited by examiner

TURBOSUPERCHARGED INTERNAL COMBUSTION ENGINE CONTROL METHOD

TECHNICAL FIELD

The present invention relates to a turbosupercharged internal combustion engine control method.

BACKGROUND ART

As is known, some internal combustion engines are equipped with a turbosupercharge system for increasing engine power using the heat content of the exhaust gas to compress the air intake of the engine and so increase volumetric efficiency.

A turbosupercharge system comprises a turbosupercharger with a turbine fitted along the exhaust pipe and rotated at high speed by the exhaust gas from the engine, and a compressor rotated by the turbine and located along the air intake pipe to compress the air intake of the engine.

In a turbosupercharge system, the operating range of the turbosupercharger must be kept within a useful area, depending on the engine operating condition, for both functional reasons (i.e. to avoid irregular or, at any rate, low-efficiency operation) and structural reasons (i.e. to avoid damaging the turbosupercharger).

More specifically, the useful operating range area is bounded, on the left of a reduced mass flow/compression ratio graph, by a pump line, and on the right by a so-called 'saturation line'. The pump line thus defines a first 'off-limit' area, and is defined by the points in which the internal aerodynamic balance of the compressor is disrupted, with periodic, loud, violent flow rejection, and possibly destructive effects on the blades. The so-called 'saturation line' defines a second 'off-limit' area, corresponds to sonic conditions (and hence flow cutoff) at the turbine inlet, and defines the maximum flow the compressor can supply under given intake environment conditions.

Patent Application EP1741895A1 describes a method of controlling an internal combustion engine supercharged by a turbosupercharger comprising a compressor; a turbine for rotating the compressor using the exhaust gas from the engine; and a wastegate valve for regulating exhaust gas flow to the turbine, to control rotation of the turbine according to a target supercharge pressure from the compressor. The control method comprises the steps of measuring the air intake pressure of the compressor; determining mass flow of the compressor; calculating—by means of a compressor operation map, and as a function of the predetermined limit rotation speed, the air pressure measurement, and mass flow—a limit supercharge pressure correlated to the air pressure obtainable from the compressor when the turbine rotates at a speed substantially equal to the predetermined limit speed; determining whether a target supercharge pressure satisfies a given relationship with the calculated limit supercharge pressure; and activating the wastegate valve, if the relationship is satisfied, to control turbine rotation speed as a function of the limit supercharge pressure, and so rotate the turbosupercharger at substantially the predetermined limit speed.

Patent Application EP2014894A1 describes a turbosupercharged internal combustion engine control method, which comprises establishing, in a reduced mass flow/compression ratio graph, at least one limit operation curve; at least one intervention curve relative to a wastegate valve regulating a turbine bypass pipe; and at least one intervention curve relative to a Poff valve regulating a compressor bypass pipe. The control method described uses the limit operation curve to limit the engine control pressure target downstream from the compressor; opens the wastegate valve when the wastegate valve intervention curve is exceeded; and opens the Poff valve when the Poff valve intervention curve is exceeded.

The EP2014894A1 control method keeps the turbosupercharger within the useful area, regardless of the operating condition of the internal combustion engine, to prevent failure or damage, but fails to enhance performance of the turbosupercharger.

Patent Application EP1323912A1 describes a turbosupercharged internal combustion engine control method, which determines a parameter depending on mass flow of the compressor, and by which to control the turbosupercharger to protect the compressor and keep the actual pressure within the specified compressor operating range.

That is, the EP1323912A1 control method determines a parameter depending on the mass flow of the compressor, and by which to control the turbosupercharger to protect the compressor, keep the actual pressure within the safe operating range of the compressor, and so prevent failure or damage, but also fails to enhance performance of the turbosupercharger.

DESCRIPTION OF THE INVENTION

It is an object of the present invention to provide a turbosupercharged internal combustion engine control method that is cheap and easy to implement, and which in particular provides for enhancing performance of the turbosupercharger in a portion of the useful turbosupercharger operating area close to the pump line.

According to the present invention, there is provided a turbosupercharged internal combustion engine control method as claimed in the accompanying Claims.

BRIEF DESCRIPTION OF THE DRAWINGS

A non-limiting embodiment of the present invention will be described by way of example with reference to the accompanying drawings, in which.

PREFERRED EMBODIMENTS OF THE INVENTION

Figure 1:
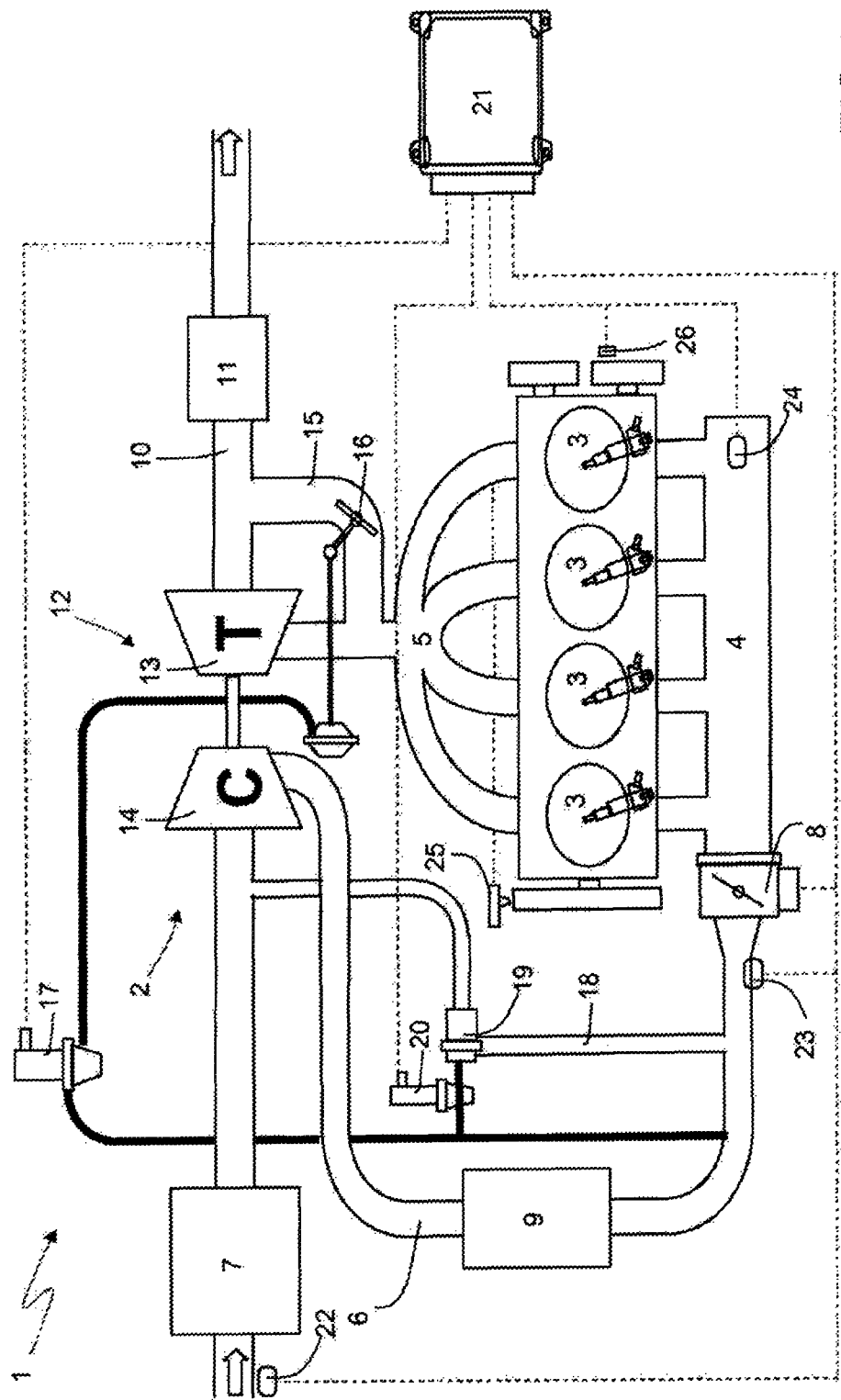
FIG. 1 shows a schematic of a turbosupercharged internal combustion engine comprising an electronic central control unit implementing a control method in accordance with the present invention.

Number 1 in FIG. 1 indicates as a whole an internal combustion engine supercharged by a turbosupercharge system 2.

Internal combustion engine 1 comprises four cylinders 3, each connected to an intake manifold 4 by at least one intake valve (not shown), and to an exhaust manifold 5 by at least one exhaust valve (not shown). Intake manifold 4 is supplied with fresh (i.e. outside) air by an intake pipe 6, which is fitted with an air filter 7, is regulated by a butterfly valve 8, and is fitted with an intercooler 9 for cooling the air intake. Exhaust manifold 5 is connected to an exhaust pipe 10, which feeds the exhaust gas produced by combustion to an exhaust system, which expels it into the atmosphere, and normally comprises at least one catalyst 11, and at least one muffler (not shown) downstream from catalyst 11.

Turbosupercharge system 2 of internal combustion engine 1 comprises a turbosupercharger 12, in turn comprising a turbine 13 located along exhaust pipe 10 and rotated at high speed by the exhaust gas from cylinders 3; and a compressor 14 located along intake pipe 6, and connected mechanically to and rotated by turbine 13 to increase the air pressure in intake pipe 6.

Exhaust pipe 10 is fitted with a bypass pipe 15 parallel-connected to turbine 13, with its ends connected upstream and downstream from turbine 13, and which is fitted with a wastegate valve 16 controlled by an actuator 17 to regulate exhaust gas flow along bypass pipe 15. Intake pipe 6 is fitted with a bypass pipe 18 parallel-connected to compressor 14, with its ends connected upstream and downstream from compressor 14, and which is fitted with a Poff valve 19 controlled by an actuator 20 to regulate (more specifically, reduce) supercharge pressure along bypass pipe 18 (or alternatively by means of an air-vent).

Internal combustion engine 1 is controlled by an electronic central control unit 21, which controls operation of all the component parts of internal combustion engine 1, including turbosupercharge system 2, and in particular actuators 17 and 20 controlling wastegate valve 16 and Poff valve 19. Electronic central control unit 21 is connected to sensors 22 for measuring the temperature $T_O$ and pressure $P_O$ along intake pipe 6, upstream from compressor 14; sensors 23 for measuring pressure along intake pipe 6, upstream from butterfly valve 8; sensors 24 for measuring temperature and pressure in intake manifold 4; a sensor 25 for determining the angular position (and therefore rotation speed) of the drive shaft of internal combustion engine 1; and a sensor 26 for determining the phase of the intake and/or exhaust valve. It is important to note that there are no sensors for determining the rotation speed of turbosupercharger 12.

Among other things, electronic central control unit 21 provides for keeping the operating range of turbosupercharger 12 within a useful area. The following is a description of the way in which electronic central control unit 21 keeps the operating range of turbosupercharger 12 within a useful area close to the saturation line.

When designing and tuning internal combustion engine 1, the characteristic curves of compressor 14 (provided by the maker of turbosupercharger 12) are analysed in a reduced mass flow/compression ratio graph. An example of the characteristic curves of a commercial compressor 14 is shown in FIG. 2.

Figure 2:
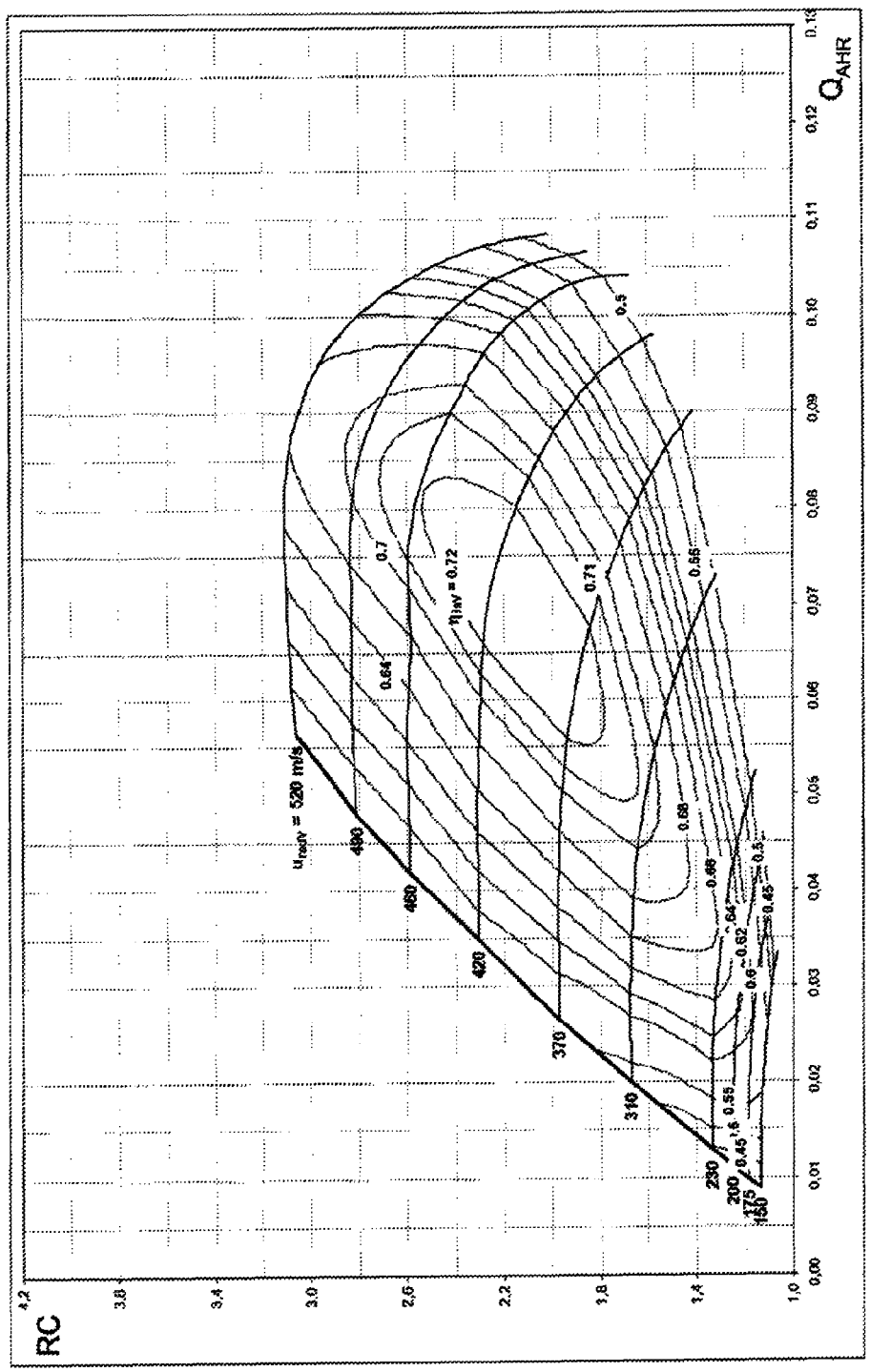
FIG. 2 shows a reduced mass flow/compression ratio graph illustrating the characteristic curves of a compressor of the FIG. 1 turbosupercharger.

The characteristic curves in FIG. 2 are normally at an absolute reference temperature $T_{O-ref}$ and absolute reference pressure $P_{O-ref}$. On the left of the reduced mass flow/compression ratio graph is a first 'off-limit' area bounded by the pump line, which is defined by the points in which the internal aerodynamic balance of compressor 14 is disrupted, with periodic, loud, violent flow rejection at the inlet, and possibly destructive effects on the blades.

On the right of the reduced mass flow/compression ratio graph is a second 'off-limit' area bounded by the so-called 'saturation line', which corresponds to sonic conditions (and hence flow cutoff) at the inlet of turbine 13, and defines the maximum flow compressor 14 can supply under given intake environment conditions.

Figure 3:
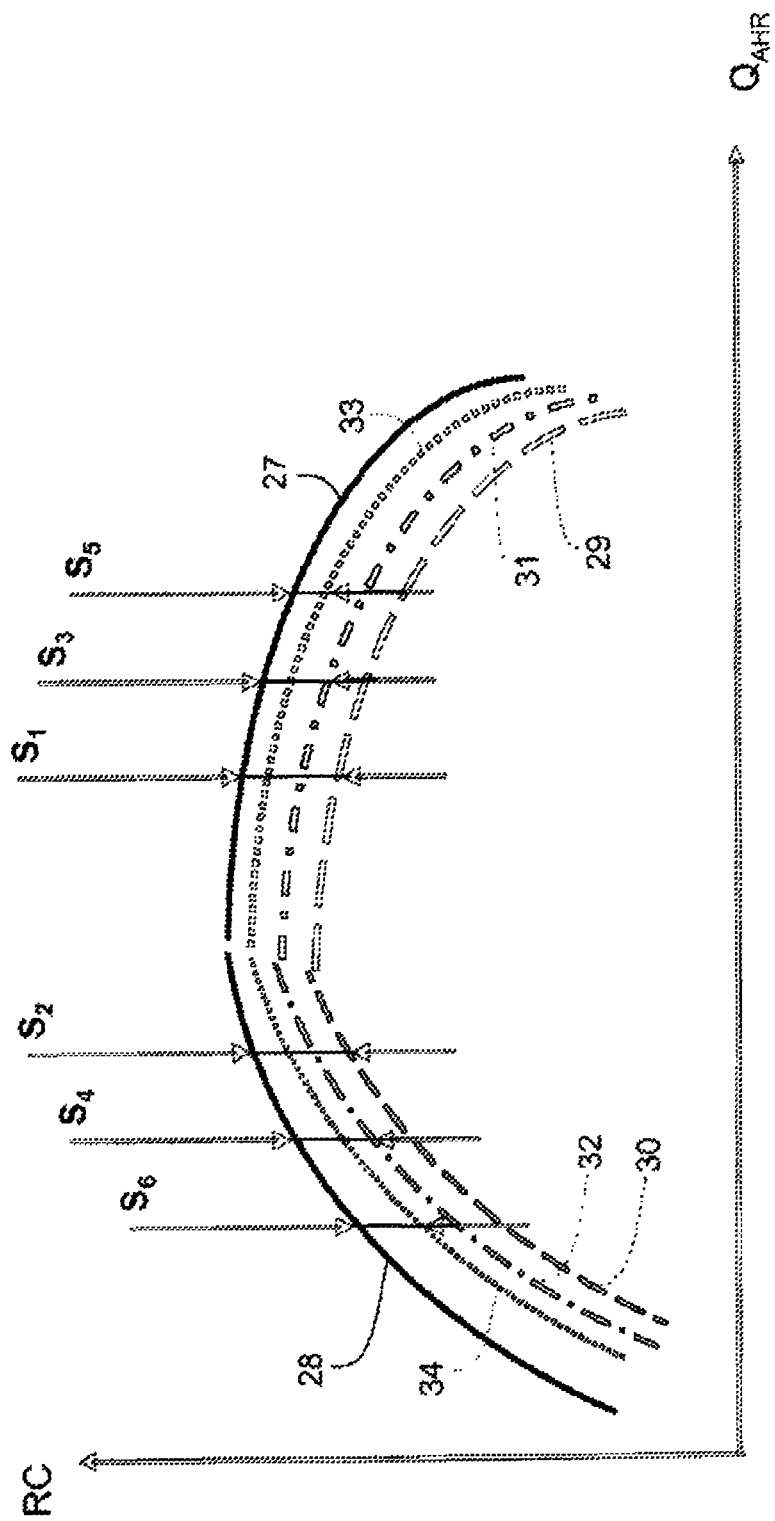
FIGS. 3 to 6 show reduced mass flow/compression ratio graphs illustrating limit operation curves and intervention curves employed in the control method implemented in the FIG. 1 electronic central control unit.

As shown in FIG. 3, the characteristic curves of compressor 14 are analysed to determine a rotation speed curve 27 of turbosupercharger 12; and a pump curve 28 of turbosupercharger 12. Two limit operation curves 29 and 30 are determined from curves 27 and 28, and used to limit the engine control pressure target downstream from compressor 14. Limit operation curve 29 is determined by determining a threshold $S_1$ establishing the distance between limit operation curve 29 and rotation speed curve 27 of turbosupercharger 12; and, similarly, limit operation curve 30 is determined by determining a threshold $S_2$ establishing the distance between limit operation curve 30 and pump curve 28 of turbosupercharger 12.

Curves 27 and 28 are also used to determine two intervention curves 31 and 32 relative to wastegate valve 16 regulating bypass pipe 15 of turbine 13; and two intervention curves 33 and 34 relative to Poff valve 19 regulating bypass pipe 18 of compressor 14. Intervention curve 31 of wastegate valve 16 is determined by determining a threshold $S_3$ establishing the distance between limit operation curve 29 and intervention curve 31 of wastegate valve 16; and, similarly, intervention curve 32 of wastegate valve 16 is determined by determining a threshold $S_4$ establishing the distance between intervention curve 32 of wastegate valve 16 and pump curve 28 of turbosupercharger 12. Intervention curve 33 of Poff valve 19 is determined by determining a threshold $S_5$ establishing the distance between limit operation curve 29 and intervention curve 33 of Poff valve 19; and, similarly, intervention curve 34 of Poff valve 19 is determined by determining a constant or variable threshold $S_6$ establishing the distance between intervention curve 34 of Poff valve 19 and pump curve 28 of turbosupercharger 12.

It is important to note how intervention curves 31 and 32 of wastegate valve 16 are located inwards of intervention curves 33 and 34 of Poff valve 19 (i.e. thresholds $S_3$ and $S_4$ are larger than thresholds $S_5$ and $S_6$). This is because, in the event curves 27 and 28 are exceeded, only wastegate valve 16 is preferably opened to limit turbosupercharger 12; and, only if opening wastegate valve 16 is insufficient, is Poff valve 19 also opened.

When internal combustion engine 1 is running, electronic central control unit 21 uses limit operation curves 29 and 30 to limit the engine control pressure target downstream from compressor 14. In other words, the engine control implemented in electronic central control unit 21 determines, in known manner and as a function of the engine operating condition, a pressure target representing the best pressure downstream from compressor 14. If compatible with limit operation curves 29 and 30 (i.e. below the value determined as a function of limit operation curves 29 and 30), the pressure target downstream from compressor 14 is maintained. Conversely, if incompatible with limit operation curves 29 and 30 (i.e. above the value determined as a function of limit operation curves 29 and 30), the pressure target downstream from compressor 14 is limited to the maximum value compatible with limit operation curves 29 and 30.

When internal combustion engine 1 is running, electronic central control unit 21 uses intervention curves 31 and 32 of wastegate valve 16 to open wastegate gate valve 16, if necessary, to maximum, regardless of the engine control target (i.e. regardless of engine control target requests).

Similarly, when internal combustion engine 1 is running, electronic central control unit 21 uses intervention curves 33 and 34 of Poff valve 19 to open Poff valve 19, if necessary, regardless of the engine control target (i.e. regardless of engine control target requests). More specifically, electronic central control unit 21 determines (as described) the current reduced mass flow $Q_{AHR}$ of compressor 14; determines the current compression ratio CR of compressor 14 (simply the ratio between the pressure measured by sensor 23 downstream from compressor 14, and the pressure measured by sensor 22 upstream from compressor 14); and opens Poff valve 19, regardless of the engine control target, if the point defined by the current reduced mass flow $Q_{AHR}$ and current compression ratio CR in the reduced mass flow/compression ratio graph is outside intervention curves 33 and 34 of Poff valve 19 (i.e. if current compression ratio CR is higher than the compression ratio CR in intervention curves 33 and 34 at the current reduced mass flow $Q_{AHR}$.

Electronic central control unit 21 is also designed to improve management of the turbosupercharger 12 operating range area close to pump curve 28, and, more specifically, to adjust operation of turbosupercharger 12, depending on whether the engine is accelerating (i.e. demanding more torque, power or airflow), decelerating (i.e. demanding less torque, power or airflow), or stationary.

When internal combustion engine 1 is running, electronic central control unit 21 is designed to modify at least one of the characteristic operating curves of compressor 14 (i.e. pump curve 28 of compressor 14, intervention curves 32 and 34 of wastegate valve 16 and Poff valve 19, and limit operation curve 30).

More specifically, characteristic operating curves 30, 32, 34 of compressor 14 are modified with respect to pump curve 28 of compressor 14, so turbosupercharger 12 can be controlled to keep reduced mass flow $Q_{AHR}$ and compression ratio CR within the new limit defined by the modified characteristic operating curves 30, 32, 34.

The best modification has been found to be achieved by shifting pump curve 28 of compressor 14 up or down on the reduced mass flow/compression ratio graph (i.e. with respect to the compression ratio CR axis). More specifically, pump curve 28 is shifted up when internal combustion engine 1 is accelerating, and down when internal combustion engine 1 is decelerating.

In a preferred variation, characteristic operating curves 30, 32, 34 of compressor 14 may also be modified by shifting them closer to or away from pump curve 28 of compressor 14.

Characteristic operating curves 30, 32, 34 of compressor 14 are actually modified by working on respective thresholds, $S_2$, $S_4$, $S_6$ defining the distances between pump curve 28 and limit operation curve 30, and intervention curves 32, 34 of wastegate valve 16 and Poff valve 19 respectively.

Characteristic operating curves 30, 32, 34 of compressor 14 and pump curve 28 are modified by means of a dynamic index $\Delta$dyn determined as a function of the mass flow dynamics of compressor 14, and, in a preferred and more accurate variation, as a function of the dynamics of reduced mass flow $Q_{AHR}$ of compressor 14.

Dynamic index $\Delta$dyn is also determined as a function of reduced mass flow $Q_{AHR}$ of compressor 14.

It is important to note that, in a preferred variation, dynamic index $\Delta$dyn is determined from the real (or current) reduced mass flow $Q_{AHR}$ of compressor 14, and the dynamics of the target reduced mass flow $Q_{AHR}$ of compressor 14 (supplied by the engine control).

Using dynamic index $\Delta$dyn, pump curve 28 of compressor 14 is modified by shifting it up or down (i.e. with respect to the compression ratio CR axis) by an amount equal to dynamic index $\Delta$dyn.

Using dynamic index $\Delta$dyn, characteristic operating curve 30, 32, 34 of compressor 14 is modified by working on respective threshold $S_2$, $S_4$, $S_6$, and, in a first variation, is shifted up or down, with respect to the compression ratio CR axis, by an amount equal to dynamic index $\Delta$dyn. Respective threshold $S_2$, $S_4$, $S_6$ is thus increased or reduced by an amount equal to dynamic index $\Delta$dyn, which, in this case, simply represents an increase or reduction in compression ratio CR of respective threshold $S_2$, $S_4$, $S_6$.

Characteristic operating curves 30, 32, 34 and pump curve 28 of compressor 14 may have different dynamic indexes $\Delta$dyn.

Figure 5:
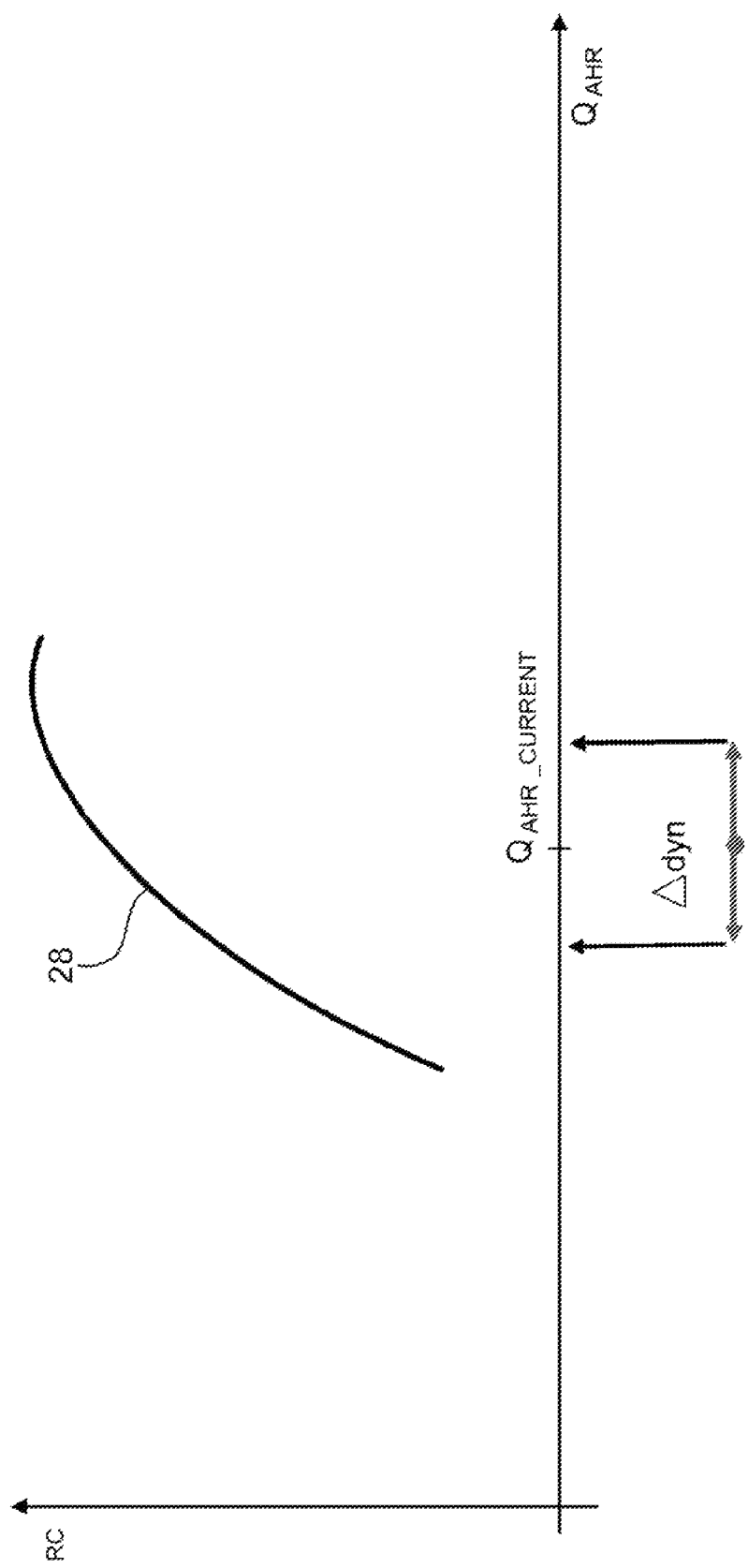

In another variation shown in FIG. 5, dynamic index $\Delta$dyn simply represents a reduced mass flow $Q_{AHR}$ which is subtracted from or added to the current reduced mass flow $Q_{AHR\_CURRENT}$.

Electronic central control unit 21 is designed to determine and correct current reduced mass flow $Q_{AHR\_CURRENT}$ by subtracting or adding a quantity equal to dynamic index $\Delta$dyn. This variation produces a rightward shift (when decelerating) or a leftward shift (when accelerating) along the reduced mass flow $Q_{AHR}$ axis, by an amount varying as a function of dynamic index $\Delta$dyn. Electronic central control unit 21 thus implements the control strategy using the current reduced mass flow $Q_{AHR}$ corrected by dynamic index $\Delta$dyn.

Figure 4:
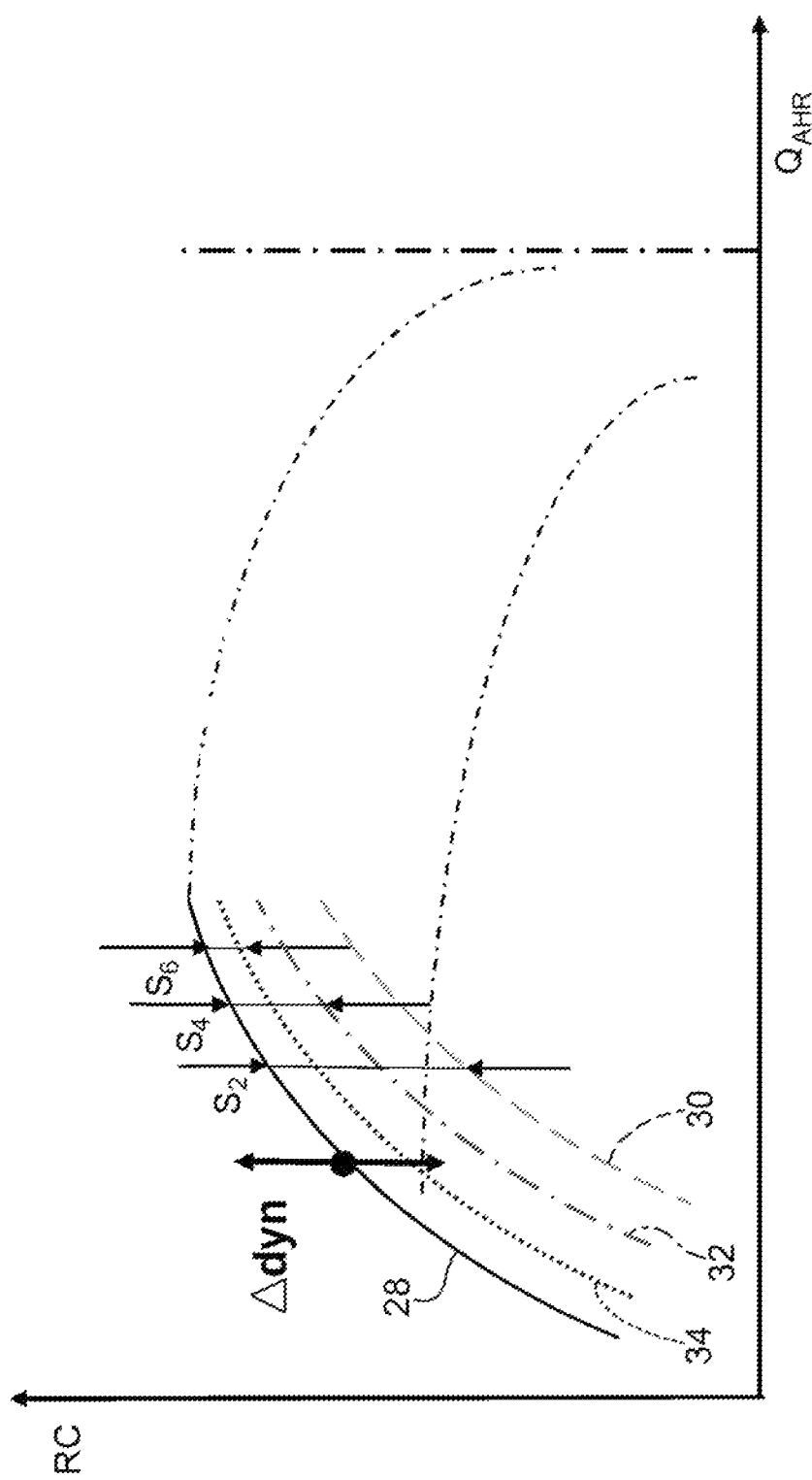

This embodiment has been found to give exactly equivalent results to those of the FIG. 4 embodiment.

The current reduced mass flow $Q_{AHR}$ of compressor 14 is determined using the equation:

$$Q_{AHR} = Q_{AH} \cdot \sqrt{\frac{T_o}{T_{orif}}} \cdot \frac{P_{orif}}{P_o}$$

$Q_{AH}$ mass flow of compressor 14
$Q_{AHR}$ reduced mass flow of compressor 14
$T_O$ absolute temperature upstream from compressor 14
$P_O$ absolute pressure upstream from compressor 14
$T_{Oref}$ absolute reference temperature
$P_{Oref}$ absolute reference pressure Absolute reference temperature $T_{Oref}$ and absolute reference pressure $P_{Oref}$ are the conditions in which the characteristic curves of compressor 14, i.e. curves 27-34, are determined, and are design data known beforehand; the absolute temperature $T_O$ and absolute pressure $P_O$ upstream from compressor 14 are measured by sensors 22; and the mass flow $Q_{AH}$ of compressor 14 may either be measured by a flow sensor or calculated in known manner by electronic central control unit 21.

In a different embodiment not shown, the absolute temperature $T_O$ upstream from compressor 14 (i.e. substantially ambient temperature) need not necessarily be measured; in which case, reduced mass flow $Q_{AHR}$ may be 'partly' normalized on the basis of the ratio between pressures $P_O$ and $P_{Oref}$, without taking into account the ratio between temperatures $T_O$ and $T_{Oref}$.

In a first variation, the step of modifying characteristic operating curves 30, 32, 34 of compressor using dynamic index $\Delta$dyn comprises only modifying intervention curve 34 of Poff valve 19, i.e. correcting respective threshold $S_6$. In other words, intervention curve 34 of Poff valve 19 is modified as a function of dynamic index $\Delta$dyn; and respective thresholds $S_4$ and $S_2$ of intervention curve 32 of wastegate valve 16 and limit operation curve 30 remain unchanged with respect to pump curve 28.

The control method also provides for determining a hysteresis operator $HYS_{WG}$ for intervention curve 32 of wastegate valve 16; and a hysteresis operator $HYS_{Poff}$ for intervention curve 34 of Poff valve 19.

In a preferred variation, at least one of hysteresis operators $HYS_{WG}$, $HYS_{Poff}$ in particular hysteresis operator $HYS_{WG}$ relative to opening wastegate valve 16, is fixed.

Hysteresis operator $HYS_{Poff}$, on the other hand, varies as a function of reduced mass flow $Q_{AHR}$ of compressor 14, the dynamics of reduced mass flow $Q_{AHR}$ of compressor 14 (i.e. dynamic index $\Delta dyn$, which in turn is a function of reduced mass flow $Q_{AHR}$ and the dynamics of reduced mass flow $Q_{AHR}$) and atmospheric pressure $P_{atm}$.

In a preferred variation, the dynamics of reduced mass flow $Q_{AHR}$ are represented by the rate of change of the target reduced mass flow $Q_{AHR}$ of compressor 14.

Electronic central control unit 21 is designed to determine the target reduced mass flow $Q_{AHR}$ supplied by the engine control, and to filter it using a first-order, preferably low-pass, filter.

The correction dynamic index $\Delta dyn$ is thus calculated as the difference between the target reduced mass flow $Q_{AHR}$ supplied by the engine control, and the filtered target reduced mass flow $Q_{AHR}$ also supplied by the engine control.

In another variation, the dynamics of reduced mass flow $Q_{AHR}$ are determined as a function of the dynamics of butterfly valve 8 regulating fresh air along intake pipe to intake manifold 4, or the dynamics of other airflow-regulating actuators (e.g. valve timing and lift).

Instead of current reduced mass flow $Q_{AHR}$, a simplified (i.e. less accurate) embodiment may employ current mass flow $Q_{AH}$ (not reduced) or the target mass flow $Q_{AHR}$ (reduced or not).

Figure 6:
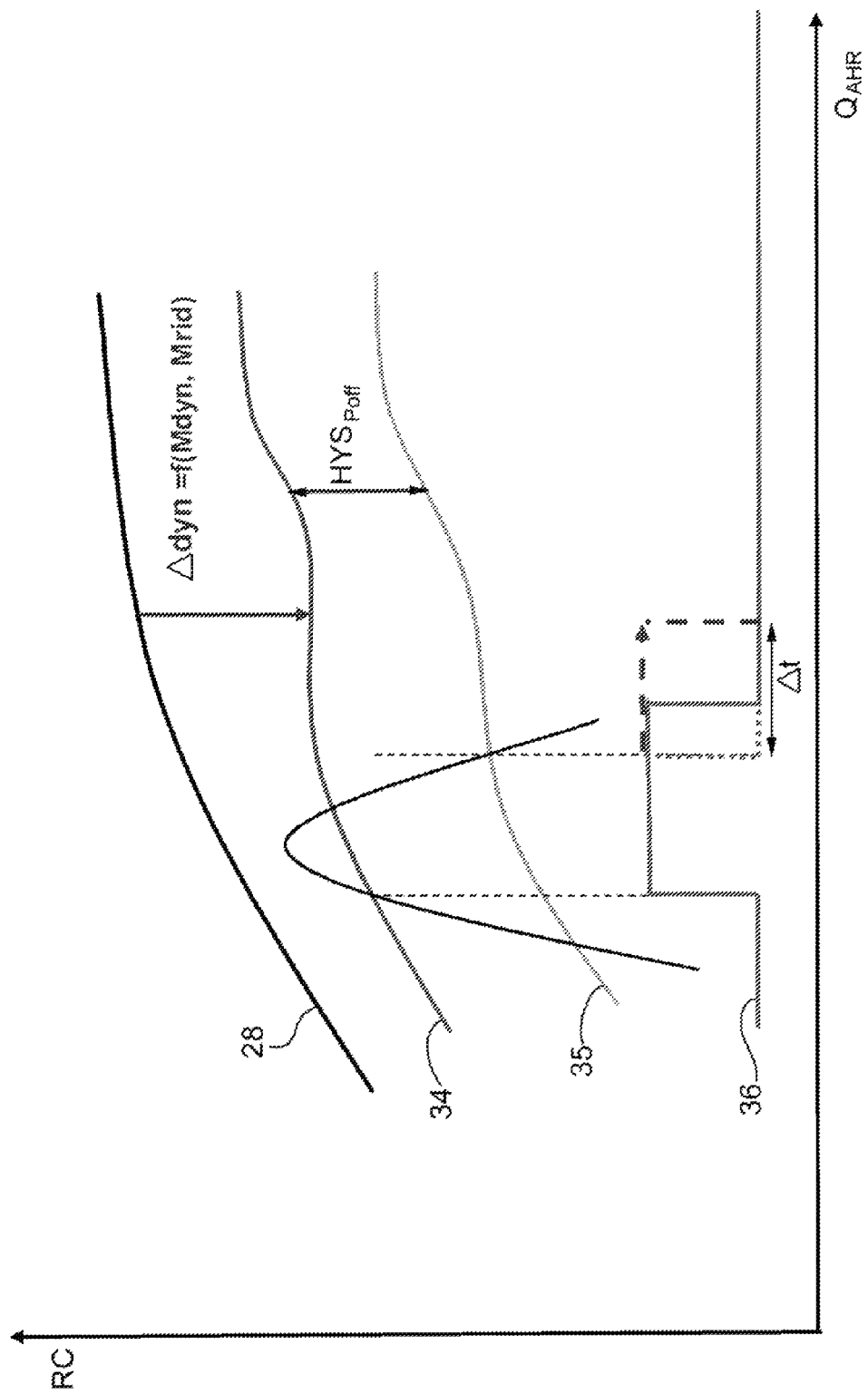

As shown in FIG. 6, electronic central control unit 21 is designed to open Poff valve 19 (regardless of the engine control target) when the point defined by current reduced mass flow $Q_{AHR}$ and current compression ratio CR on the reduced mass flow/compression ratio graph lies outside intervention curve 34 of Poff valve 19; and, similarly, to close Poff valve 19 (regardless of the engine control target) as soon as the point defined by current reduced mass flow $Q_{AHR}$ and current compression ratio CR on the reduced mass flow/compression ratio graph returns within the limit area defined by a Poff valve 19 closure curve 35 (determined as a function of hysteresis operator $HYS_{Poff}$).

In another variation, closure of Poff valve 19 may be delayed. In which case, a limit time interval $\Delta t$, and a tolerance value TV, which varies as a function of reduced mass flow $Q_{AHR}$, are determined at a preliminary setup stage.

As soon as the point defined by current reduced mass flow $Q_{AHR}$ and current compression ratio CR on the reduced mass flow/compression ratio graph returns within the limit area defined by Poff valve 19 closure curve 35, a timer is started, and closure of Poff valve 19 is delayed, i.e. Poff valve 19 is kept open, as long as the difference between the target pressure value, supplied by the engine control, and the current pressure value does not exceed, i.e. is below, tolerance value TV.

In a preferred variation, electronic central control unit 21 is designed not to delay closure of Poff valve 19 for longer than the limit time interval $\Delta t$, i.e. closes Poff valve 19 after a time lapse equal to limit time interval $\Delta t$.

The control method described so far may be enhanced by an algorithm for opening Poff valve 19 (in particular, early) as a function of the closure dynamics of butterfly valve 8 regulating intake pipe 6 of supercharged internal combustion engine 1. More specifically, Poff valve 19 is opened early in at least one of the following conditions:

$$-\alpha_{target\_fil} - \alpha_{target} > S1$$

where $\alpha_{target\_fil}$ is the filtered target closure angle of butterfly valve 8; $\alpha_{target}$ is the target closure angle of butterfly valve 8; and S1 is a threshold value determined at a preliminary setup stage;

$$-Pt - Pt_{target} > S2$$

where Pt is the supercharge pressure of turbosupercharger 12; $Pt_{target}$ is the target supercharge pressure of turbosupercharger 12; and S2 is a threshold value determined at a preliminary setup stage;

$$Q_{AHR} > S3$$

where $Q_{AHR}$ is reduced mass flow; and S3 is a threshold value determined at a preliminary setup stage.

In a preferred variation, electronic central control unit 21 is designed to prolong opening of Poff valve 19 by a predetermined time interval $\Delta t_2$, e.g. by means of a timer, which is started the instant the above conditions no longer apply (i.e. the instant which should correspond to closure of Poff valve 19).

In another variation, Poff valve 19 is kept open as long as the difference between supercharge pressure Pt and target supercharge pressure $Pt_{target}$ of turbosupercharger 12 is less than or equal to a threshold value S4 determined at a preliminary setup stage.

The control method described has numerous advantages, by being cheap and easy to implement, not requiring particularly high computing power of electronic central control unit 21, and not requiring any additional component parts (in particular, sensors or actuators) over and above those already provided on modern internal combustion engines.

The control method described provides for enhancing both acceleration and deceleration performance of turbosupercharger 12 in the portion of the useful operating range close to pump curve 28, and so preventing failure or malfunctioning, by taking into account the dynamics (i.e. rate of change) of reduced mass flow $Q_{AHR}$ of compressor 14, as opposed to simply reduced mass flow $Q_{AHR}$.

The invention claimed is:

1. A method of controlling an internal combustion engine (1) supercharged by a turbosupercharger (12) comprising a turbine (13) and a compressor (14); the control method comprising the steps of:

determining, in a reduced mass flow/compression ratio graph, at least one limit operation curve (28, 30, 32, 34) of the compressor (14) representing a limit of the operating range of the compressor (14); and controlling the turbosupercharger (12) to keep the actual reduced mass flow ($Q_{AHR}$) and actual compression ratio (CR) of the compressor (14) within the limit defined by the limit operation curve (28, 30, 32, 34) of the compressor (14);

determining an index ($\Delta dyn$) varying as a function of the dynamics of the reduced mass flow ($Q_{AHR}$) of the compressor (14); and modifying the limit operation curve (28, 30, 32, 34) of the compressor (14) as a function of the index ($\Delta dyn$) wherein a first limit operation curve (28, 30, 32, 34) of the compressor (14) is shifted, in the reduced mass flow/compression ratio graph, by an amount which is a function of the index ($\Delta dyn$) and wherein the first limit operation curve (28) of the compressor (14) is a pump curve (28) of the compressor (14), which defines the points beyond which the internal aerodynamic balance of the compressor (14) is disrupted; and the first limit operation curve (28) of the compressor (14) is shifted up, in the reduced mass flow/compression ratio graph, when the internal combustion engine (1) accelerates, and down when the internal combustion engine (1) decelerates.

2. A control method as claimed in claim 1, wherein the index (Δdyn) varies as a function of the reduced mass flow ($Q_{AHR}$) of the compressor (14).

3. A control method as claimed in claim 2, wherein the dynamics of the reduced mass flow ($Q_{AHR}$) of the compressor (14) are the dynamics of the target reduced mass flow ($Q_{AHR}$) of the compressor (14) supplied by the engine control; and the reduced mass flow ($Q_{AHR}$) of the compressor (14) is the real reduced mass flow ($Q_{AHR}$) of the compressor (14).

4. A control method as claimed in claim 1, wherein the absolute value of the index (Δdyn) is subtracted from a current reduced mass flow ($Q_{AHR\_CURRENT}$) of the compressor (14) when the internal combustion engine (1) decelerates, so as to shift the first limit operation curve (28) of the compressor (14) rightwards in the reduced mass flow/compression ratio graph; and the absolute value of the index (Δdyn) is added to the current reduced mass flow ($Q_{AHR\_CURRENT}$) of the compressor (14) when the internal combustion engine (1) accelerates, so as to shift the first limit operation curve (28) of the compressor (14) leftwards in the reduced mass flow/compression ratio graph.

5. A control method as claimed in one of claim 1 and comprising the further step of determining a second limit operation curve (30, 32, 34) of the compressor (14) as a function of the first limit operation curve (28) of the compressor (14).

6. A control method as claimed in claim 5, and comprising the further step of determining the second limit operation curve (30, 32, 34) of the compressor (14) by applying a safety threshold ($S_2$, $S_4$, $S_6$) to the first limit operation curve (28) of the compressor (14).

7. A control method as claimed in claim 6, and comprising the further step of modifying the second limit operation curve (30, 32, 34) of the compressor (14) as a function of the index (Δdyn), by modifying the safety threshold ($S_2$, $S_4$, $S_6$) as a function of the index (Δdyn).

8. A control method as claimed in claim 7, wherein the index (Δdyn) is added to or subtracted from the safety threshold ($S_2$, $S_4$, $S_6$).

9. A control method as claimed in claim 6, wherein the safety threshold ($S_2$, $S_4$, $S_6$) varies as a function of the reduced mass flow ($Q_{AHR}$) of the compressor (14).

10. A control method as claimed in claim 1 and comprising the further step of using a hysteresis operator ($HYS_{WG}$, $HYS_{Poff}$) for a limit operation curve (32, 34) of the compressor (14).

11. A control method as claimed in claim 10, wherein the hysteresis operator ($HYS_{Poff}$) varies as a function of the reduced mass flow ($Q_{AHR}$) of the compressor (14) and/or atmospheric pressure ($P_{atm}$) and/or the dynamics of the reduced mass flow ($Q_{AHR}$) of the compressor (14).

12. A control method as claimed in claim 10, wherein the hysteresis operator ($HYS_{Poff}$) varies as a function of the index (Δdyn).

13. A control method as claimed in claim 1, wherein the dynamics of the reduced mass flow ($Q_{AHR}$) of the compressor (14) are defined by the rate of change of the reduced mass flow ($Q_{AHR}$) of the compressor (14).

14. A control method as claimed in claim 13, and comprising the further steps of:
determining a target reduced mass flow ($Q_{AHR}$) supplied by the engine control;
filtering the target reduced mass flow ($Q_{AHR}$) with a low-pass filter; and
calculating the rate of change of the reduced mass flow ($Q_{AHR}$) of the compressor (14) as the difference between the target reduced mass flow ($Q_{AHR}$) and the filtered target reduced mass flow ($Q_{AHR}$).

15. A control method as claimed in claim 1, wherein the dynamics of the reduced mass flow ($Q_{AHR}$) of the compressor (14) are determined as a function of the dynamics of a butterfly valve (8) regulating an intake pipe (6) of the supercharged internal combustion engine (1).

16. A control method as claimed in claim 1, and comprising the further steps of:
using a first limit operation curve (30) of the compressor (14) to saturate a target supercharge pressure;
using a second limit operation curve (32) of the compressor (14) to control a wastegate valve (16), in such a manner as to open the wastegate valve (16) when the second limit operation curve (32) of the compressor (14) is exceeded; and
using a third limit operation curve (34) of the compressor (14) to control a Poff valve (19), in such a manner as to open the Poff valve (19) when the third limit operation curve (34) of the compressor (14) is exceeded.

17. A control method as claimed in claim 16, and comprising the further steps of:
determining a limit time interval (Δt) at a preliminary setup stage; and
delaying closure of the Poff valve (19) by a time interval at most equal to the limit time interval (Δt).

18. A control method as claimed in claim 16, and comprising the further steps of:
determining a tolerance value (TV) at a preliminary setup stage;
calculating the difference between the current supercharge pressure of the turbosupercharger (12) and the target supercharge pressure of the turbosupercharger (12); and
closing the Poff valve (19) when the difference between the current supercharge pressure of the turbosupercharger (12) and the target supercharge pressure of the turbosupercharger (12) is less than or equal to the tolerance value (TV).

19. A control method as claimed in claim 18, wherein the tolerance value (TV) is determined as a function of the reduced mass flow ($Q_{AHR}$) of the compressor (14).

20. A control method as claimed in claim 1, wherein the supercharged internal combustion engine (1) comprises a Poff valve (19), and a butterfly valve (8) for regulating an intake pipe (6); the control method comprising the step of opening the Poff valve (19) as a function of the closure dynamics of the butterfly valve (8).

21. A control method as claimed in claim 20, and comprising the further step of determining a first safety value (S1) at a preliminary setup stage; and wherein the Poff valve (19) is opened when the difference between the filtered target closure angle of the butterfly valve (8) and the target closure angle of the butterfly valve (8) exceeds the first safety value (S1).

22. A control method as claimed in claim 20, and comprising the further step of determining a second safety value (S2) at a preliminary setup stage; and wherein the Poff valve (19) is opened when the difference between the supercharge pressure (Pt) of the turbosupercharger (12) and the target supercharge pressure ($Pt_{target}$) of the turbosupercharger (12) exceeds the second safety value (S2).

23. A control method as claimed in claim 20, and comprising the further step of determining a third safety value (S3) at a preliminary setup stage; and wherein the Poff valve (19) is opened when the reduced mass flow ($Q_{AHR}$) of the compressor (14) exceeds the third safety value (S3).

24. A control method as claimed in claim 21, and comprising the further steps of:

determining a limit time interval ($\Delta t_2$) at a preliminary setup stage; and delaying closure of the Poff valve (19) by a time interval at most equal to the limit time interval ($\Delta t_2$).

25. A control method as claimed in claim 21, and comprising the further steps of:

determining a fourth safety value (S4) at a preliminary setup stage;

calculating the difference between the supercharge pressure (Pt) of the turbosupercharger (12) and the target supercharge pressure ($Pt_{target}$) of the turbosupercharger (12); and closing the Poff valve (19) when the difference between the supercharge pressure (Pt) of the turbosupercharger (12) and the target supercharge pressure ($Pt_{target}$) of the turbosupercharger (12) is less than or equal to the fourth safety value (S4).

\* \* \* \* \*